Figure 1:
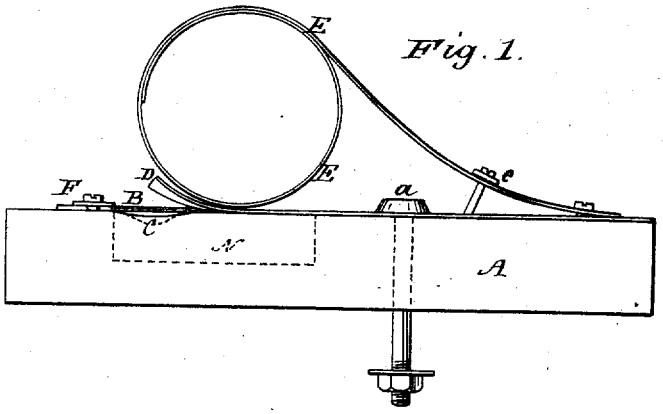

G. M. RICHMOND,

Assignor, by mesne assignments, to L. A. WATSON.

Method and Machine for Shaving or Splitting and Witheing the Shafts of Feathers.

No. 8,821. Reissued July 22, 1879.

Witnesses:

W. B. Masson

W. E. Bowen

Inventor:

Gilbert M. Richmond by E. E. Masson atty.

N. PETERS, PHOTO-LITHOGRAPHER, WASHINGTON, D. C.

UNITED STATES PATENT OFFICE

GILBERT M. RICHMOND, OF CHICAGO, ILLINOIS, ASSIGNOR, BY MESNE ASSIGNMENTS, TO LEONARD A. WATSON, OF ASHTABULA, OHIO.

IMPROVEMENT IN METHOD AND MACHINE FOR SHAVING OR SPLITTING AND WITHEING THE SHAFTS OF FEATHERS.

Specification forming part of Letters Patent No. 158,128, dated December 22, 1874; Reissue No. 8,821, dated July 22, 1879; application filed June 30, 1879.

*To all whom it may concern:*

Be it known that I, GILBERT M. RICHMOND, formerly of Geneva, in the county of Walworth and State of Wisconsin, but now of Chicago, in the county of Cook and State of Illinois, have invented a Method and Machine for Shaving or Splitting and Witheing the Shafts of Feathers preparatory to making them into feather dusters, of which the following is a specification, in which reference is made to the annexed drawings, making part thereof.

The large, stiff, hard, and heavy feathers from the wings and tails of turkeys, and similar feathers of other birds, in their natural state, before the date of my invention were generally thrown away as a waste product.

A principal object of my invention is to utilize such feathers, by converting them by mechanical treatment into light, soft, and pliable plumes, suitable for the manufacture of soft, flexible, light, and durable feather dusters, of a quality suitable for most uses for which the more expensive and less durable ostrich-feather duster, so called, has heretofore been deemed indispensable.

The mechanical treatment to which the feather is to be subjected to accomplish the purpose aforesaid is, first, to shave or split off the part known as the "rib," which is the portion of the shaft on the under side of the feather that projects below the plane of the vane whose barbs grow from the edges of the horny back of the shaft.

The rib consists of a strong horny shell filled with pith, is very stiff, and constitutes, with the under side of the quill, which is split off with it, more than half of the weight, bulk, and stiffness of the shaft, so that the horny back of the shaft, thus stripped of its rib, is left with its stiffness, size, and weight greatly reduced, making the plume, of which it is the backbone, correspondingly soft and pliant. But the feather thus deprived of the support of its rib in use is very liable to be bent beyond its limit of elasticity and broken down, the overstrained part of the bend acting like a hinge and allowing the drooping end of the feather to swing about, to the impairment of the symmetry, elasticity, and efficiency of a duster of which it is a component. This tendency of the stripped shaft to break down is overcome by withing it, to loosen its fibers and destroy its brittleness, by the action of the stretching, rubbing, pressure, and bending, or some of them, to which it is subjected by running along it, under tension, a sharp short bend, like a wave, by drawing said shaft lengthwise round a protuberance suitably arranged for the purpose.

The mechanism which I have devised for carrying into effect the before-described treatment of stiff heavy feathers, for rendering them pliable, light, elastic, and suitable for making soft feather dusters, is represented in said drawings, in which—

Figure 2:
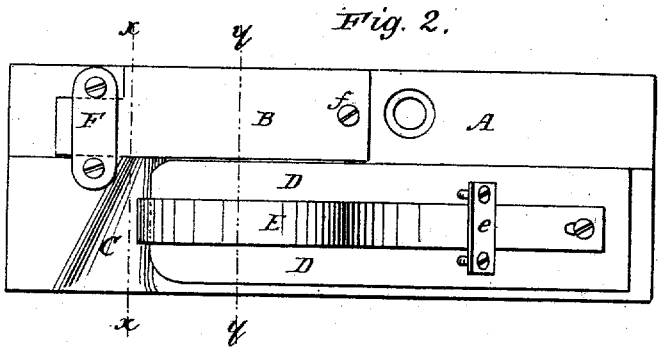
Figure 3:
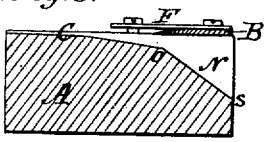
Figure 4:
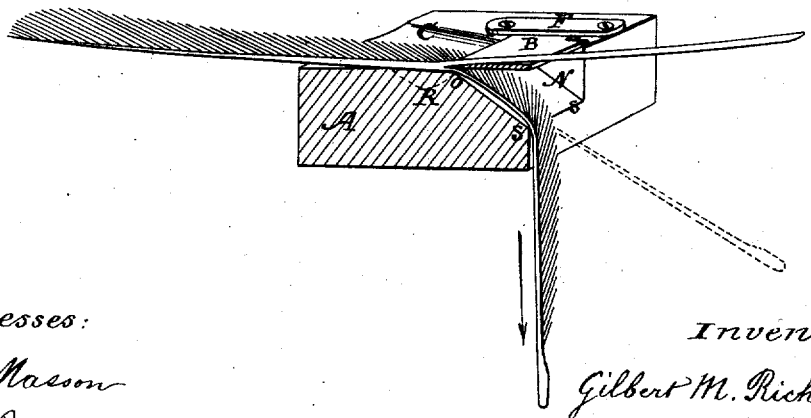

Figure 1 is a side elevation of a splitting and withing machine. Fig. 2 is a top view of the same. Fig. 3 is a transverse sectional view at the dotted line *x x* of Fig. 2; and Fig. 4 is a view in perspective of a transverse section at the dotted line *y y* in Fig. 2, and of the end of the machine at the left of this section-line, the pressure guide-plate and attachments being removed, and a feather in section shown passing through the machine and undergoing the two operations of splitting and withing in immediate succession.

In these drawings, A denotes the bed-plate, on which some of the operative parts of the machine are formed, and to which others are attached. This bed-plate may be secured to a convenient work-bench by means of the screw *a*. On one edge of the top of the bed-plate a slanting notch, N, is formed, of a length a little shorter than the splitting-knife, and of greater width than depth, so that the angle *o*, at which its sloping bottom meets the top of the bed-plate, is less than the angle *s*, at which it meets the side of the bed-plate.

Across the top of the bed-plate and leading to one end of the notch N a feeding-channel, C, is made, which is deep enough at the end next the notch to permit the quill of a large feather to pass beneath the splitting-knife, but grows shallower as it extends away from the notch N.

A portion, R, of the top of the bed-plate adjacent to the notch N is below the plane of the top. At the end next the channel C this depressed surface is lower by a depth of a little more than the thickness of the large end of the horny back of the shaft of the largest feather which the machine is designed to split; and at its opposite end it is lower by a depth only equal to the thickness of the small end of the back of the shaft of the smallest feather to be split at the point where the small end of the rib in splitting it off is run out by a slant cut, at a point some distance from the tip of the feather, where the shaft unsplit becomes sufficiently pliable. This depressed surface R forms a rest for the support of the back of the shafts of the feathers during the operations of splitting and witheing.

The splitting-knife B is a tempered steel blade with a thin sharp edge and a wide back to give it stiffness. It is placed upon the bed-plate, over the notch N, with its edge overlapping the rest R, as shown, to form one side of a tapering slot or opening, the rest R forming the other side. This slot gages the distance from the back of the shaft at which the cut will be made in splitting off the rib. The back will pass through the slot beneath the knife, and the severed rib will pass over the knife. As the stem is borne toward the narrow end of the slot by the lateral movement in splitting, the back becomes progressively thinner, and by this means the knife can be made to cut off the rib as close to the back as is practicable without mutilating the barbs of the vane which grow out from the edges of the back.

One end of the blade B is secured to the bed-plate by a screw, *f*, on which it may turn as a pivot to open out like a pocket-knife, to facilitate sharpening. The opposite end of the knife is secured in place by a clamp-plate, F, held by screws.

Parallel to the edge of the knife B, and above the rest R, a yielding-pressure guide-plate, D, is arranged, to hold the shaft of the feather down to the rest, that it may be guided properly to the edge of the knife and prevented from turning up and being cut in two. The guide-plate also holds down the barbs and guides them into the slot, to prevent them from turning up and being mutilated by contact with the edge of the knife.

The front end of the pressure-plate is bent upward and overlies the edge of the channel C, to facilitate the insertion of the quill of the feather under it by a lateral movement. This plate is fastened at its rear end to the bed-plate, and its pressure upon the feathers being split is maintained by a spring, E, the tension of which can be regulated by a clamp, *e*, adjusted by set-screws.

The angles *o* and *s*, respectively, at the top and bottom of the notch N, form ridges or protuberances, over and around which the backs of the split shafts of the feathers are to be bent and drawn to withe them. The upper angle, round which the back of the shaft is first bent, is less acute than the second. This causes the withing to be done gradually by steps, instead of by a single and more violent action. The increased tension required to overcome the increased friction in drawing the back round the second and more acute angle subjects it to increased stretching, rubbing, and pressure, as well as to increased flexure, and therefore the back of the shaft is more effectively withed than if it were only drawn round the upper angle, as shown by the position of the feather in dotted lines in Fig. 4.

The parts of the bed-plate liable to wear rapidly may, if desired, be faced with hard metal.

The operation of this machine in splitting and witheing is as follows: As many stiff heavy feathers as can conveniently be grasped and held being taken in the left hand of the operator, who is seated before the notched side of the machine, one of the feathers so held is advanced in the hand about half its length beyond the rest, and its quill placed in the feeding-channel C and moved forward until the end of the quill is under the edge of the knife, when, by a vigorous end and side thrust of the left hand, the shaft is pushed beneath the pressure-plate and against the edge of the knife, which cleaves it, the rib passing over the knife and the back passing through the slot until the end of the quill with the large end of the horny back protrudes out of the slot N far enough to be grasped by the thumb and fingers of the right hand, by which it is seized; then, by a rapid pull of that hand to the left and downward, the shaft of the feather is drawn across the edge of the knife and toward the narrow end of the slot, out of which the tip end of the stem passes unsplit, as the knife runs out of the surface of the rib as soon as the shaft has tapered down small enough to have the requisite pliability without splitting. The back of the shaft passes through the slot, but the rib sliced off it passes over the knife.

The movement of the shaft just described along and through the slot, to gage properly the thickness of the rib to be sliced off and of back to be left, causes the knife to make a long sloping draw-cut, by which it severs the rib with great smoothness and ease. While the shaft is thus thrust and drawn through the machine to divest it of the rib, the back, as it leaves the cutting-edge, is bent round the angles *o* and *s* as it passes over them, thus causing two successive series of bend-waves to run from a point near the large end of the back to a point near its small end, thereby witheing it, to impart such pliancy and elasticity combined as will prevent it from breaking down, and at the same time fit it for making soft dusters of high quality.

If, through accident or otherwise, the shaft of a feather should fail to be withed, or should be withed insufficiently at the time of splitting, or if, because of the increased labor, particularly when boys or girls are employed to work the machine, it should be preferred to do the splitting and witheing of the shafts of feathers separately, the feathers after splitting can easily be withed at a subsequent time without bringing them in contact with the edge of the knife by simply drawing them, large end first and back down, through the wide end of the slot directly across the rest and the withing protuberances, instead of obliquely, as when both the splitting and witheing are done in immediate succession.

It is merely a matter of convenience whether the splitting and witheing be done at the same or at different times, for if the back, when pulled with the right hand to strip off the rib, be held nearly in the plane of the under side of the knife, the back will not be borne against and bent round the witheing angles or ridges, and it will remain hard and unwithed.

One feather being thus prepared, another from the left hand of the operator is inserted into the machine, and the same operations to which the previous feather was subjected are repeated, an expert operator passing the feathers through in very rapid succession.

What I claim in the foregoing is—

1. The combination of the knife B and rest R, arranged with a tapering slot between them on a common bed-plate, A, substantially as described.

2. The combination of the knife B and rest R with the yielding-pressure guide-plate D, for holding and guiding the feathers in the process of softening them, substantially as described.

3. The combination of a knife for stripping the ribs from the backs of the shafts of feathers with ridges or protuberances for witheing such stripped backs, substantially as described.

4. The method of increasing the softness of the shafts of large stiff feathers in preparing them for making feather dusters, by subjecting them to the action of waves of flexure or pressure and rubbing under tension, substantially as described.

5. The method of preparing large, stiff, and heavy feathers for the manufacture of pliable, light, and soft dusters, by stripping off the ribs to lessen the weight and stiffness of the feathers, and witheing the stripped shafts to increase their pliability and prevent them from breaking down, substantially as described.

In witness whereof I have hereunto subscribed my name this 18th day of February, 1879.

GILBERT M. RICHMOND.

In presence of—
JNO. C. MACGREGOR,
W. C. CORLIES.